United States Patent
Rossbacher et al.

(10) Patent No.: US 10,198,304 B2
(45) Date of Patent: Feb. 5, 2019

(54) TARGETED CRASH FIXING ON A CLIENT DEVICE

(71) Applicant: Oath Inc., New York, NY (US)

(72) Inventors: Andreas Rossbacher, San Francisco, CA (US); Brian Coe, Scotts Valley, CA (US); Jon Herron, Sunnyvale, CA (US); Alex Hanuska, Campbell, CA (US)

(73) Assignee: Oath Inc., New York, NY (US)

( * ) Notice: Subject to any disclaimer, the term of this patent is extended or adjusted under 35 U.S.C. 154(b) by 95 days.

(21) Appl. No.: 14/532,450

(22) Filed: Nov. 4, 2014

(65) Prior Publication Data
US 2016/0124799 A1    May 5, 2016

(51) Int. Cl.
| | | |
|---|---|---|
| *G06F 11/00* | (2006.01) | |
| *G06F 11/07* | (2006.01) | |
| *G06F 8/65* | (2018.01) | |

(52) U.S. Cl.
CPC ............ *G06F 11/0793* (2013.01); *G06F 8/65* (2013.01); *G06F 11/0709* (2013.01); *G06F 11/0742* (2013.01)

(58) Field of Classification Search
CPC ............. G06F 11/0709; G06F 11/0748; G06F 11/0781; G06F 11/0793; G06F 11/079
USPC ..................................................... 714/38.14
See application file for complete search history.

(56) References Cited

U.S. PATENT DOCUMENTS

| | | | | |
|---|---|---|---|---|
| 5,467,449 A * | 11/1995 | Gauronski | ......... | H04N 1/32646 399/42 |
| 6,883,119 B1 * | 4/2005 | Bette | ....................... | H04L 41/06 714/4.3 |
| 7,484,134 B2 * | 1/2009 | Wolf | ..................... | G06Q 10/107 714/46 |
| 7,577,879 B2 * | 8/2009 | Lantz | ................... | G06F 11/0742 714/38.1 |
| 7,624,309 B2 * | 11/2009 | Birnbaum | ........... | G06F 11/0709 379/9.03 |
| 7,757,126 B2 * | 7/2010 | Vidiyala | .............. | G06F 11/0748 714/26 |
| 7,788,536 B1 * | 8/2010 | Qureshi | .................. | G06N 5/048 714/26 |
| 8,166,459 B2 * | 4/2012 | Suenbuel | ............... | G06F 11/366 714/25 |
| 2002/0087680 A1 * | 7/2002 | Cerami | ................. | G06Q 10/087 709/224 |
| 2005/0081118 A1 * | 4/2005 | Cheston | .............. | G06F 11/0748 714/47.1 |

(Continued)

*Primary Examiner* — Elmira Mehrmanesh
(74) *Attorney, Agent, or Firm* — Cooper Legal Group, LLC

(57) ABSTRACT

Client devices having deployed an application may experience a crash of the application. For example, a first client device may experience a first crash having a first crash signature of the application. After experiencing the first crash, a first device identification of the first client device may be assigned to a first bucket designating one or more device identifications of client devices having experienced the first crash. Client devices having device identifications in the first bucket are provided with a first crash fix for the first crash, while a second client device is not provide with the first crash fix, where the application is deployed on the second client device and the second client device was not assigned to the first bucket.

20 Claims, 13 Drawing Sheets

(56) References Cited

U.S. PATENT DOCUMENTS

| | | | |
|---|---|---|---|
| 2005/0120273 A1* | 6/2005 | Hudson | G06F 11/0748 714/38.11 |
| 2006/0107088 A1* | 5/2006 | Katayama | H04L 41/06 714/4.1 |
| 2006/0136784 A1* | 6/2006 | Prescott | G06F 11/0748 714/38.11 |
| 2006/0233311 A1* | 10/2006 | Adams, Jr. | H04L 12/2697 379/21 |
| 2007/0022320 A1* | 1/2007 | Flocken | G06F 11/0709 714/37 |

\* cited by examiner

TARGETED CRASH FIXING ON A CLIENT DEVICE

BACKGROUND

Numerous client devices deploying an application may experience crashes of the application. When a client device experiences a crash, a crash "fix" is developed. The crash fix is sent to client devices on which the application is deployed. In an example, the crash fix is integrated into an updated version of the application, and the updated version of the application is sent to client devices having the application. Sending crash fixes or updated versions of the application to client devices may consume a significant amount of network bandwidth and computing power, which may be unnecessarily consumed when less than all client devices may need the crash fixes (e.g., some client devices may not experience the crash, such as due to different hardware and/or software configurations that may not induce the crash).

SUMMARY

In accordance with the present disclosure, a group of users that have deployed an application on client devices may be identified. In an example, the group of users may comprise a first user having a first client device and a second user having a second client device. A first device identification may be received from the first client device. The first device identification may comprise a first crash signature indicating that the application experienced a first crash on the first client device. The first device identification may be assigned to a first bucket designating one or more device identifications of client devices having experienced the first crash.

A first crash fix may be generated for the first crash. The first crash fix may be provided to client devices identified by the one or more device identifications of the first bucket. The first crash fix may be provided to the first client device but not the second client device.

In an example, responsive to receiving a crash confirmation fix for the first crash from the first client device, the first client device identification may be removed from the first bucket. In an example, responsive to the first crash fix not resolving the first crash for the first client device, the assignment of the first device identification to the first bucket may be retained and a second crash fix may be generated to address the first crash. The second crash fix may be provided to the first client device. In an example, responsive to the first crash fix not being received by the first client device, the assignment of the first device identification to the first bucket may be retained and the first crash fix may be provided to the first client device again.

In an example, responsive to an updated version of the application being available, the updated version of the application may be sent to the first client device if the updated version of the application includes the first crash fix. If the updated version does not include the crash fix, then the first crash fix (e.g., but not the updated version) may be sent to the first client device. Responsive to the first client device receiving at least one of the first crash fix or the updated version, the first device identification may be removed from the first bucket.

In an example, a second device identification may be received from the second client device. The second device identification may comprise a second crash signature indicating that the application experienced the second crash on the second client device. In an example, the first device identification from the first client device may indicate that the application experienced the second crash on the first client device. In an example, at least one of the first device identification or the second client identification may be assigned to a second bucket designating one or more device identifications of client devices having experienced the second crash. A second crash fix may be generated for the second crash. The second crash fix may be provided to client devices identified by the one or more device identifications of the second bucket. In an example, the second crash fix may be provided to the first client device and/or the second client device. In an example, the first device identification and the second device identification may be removed from the second bucket after the second crash fix is provided.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
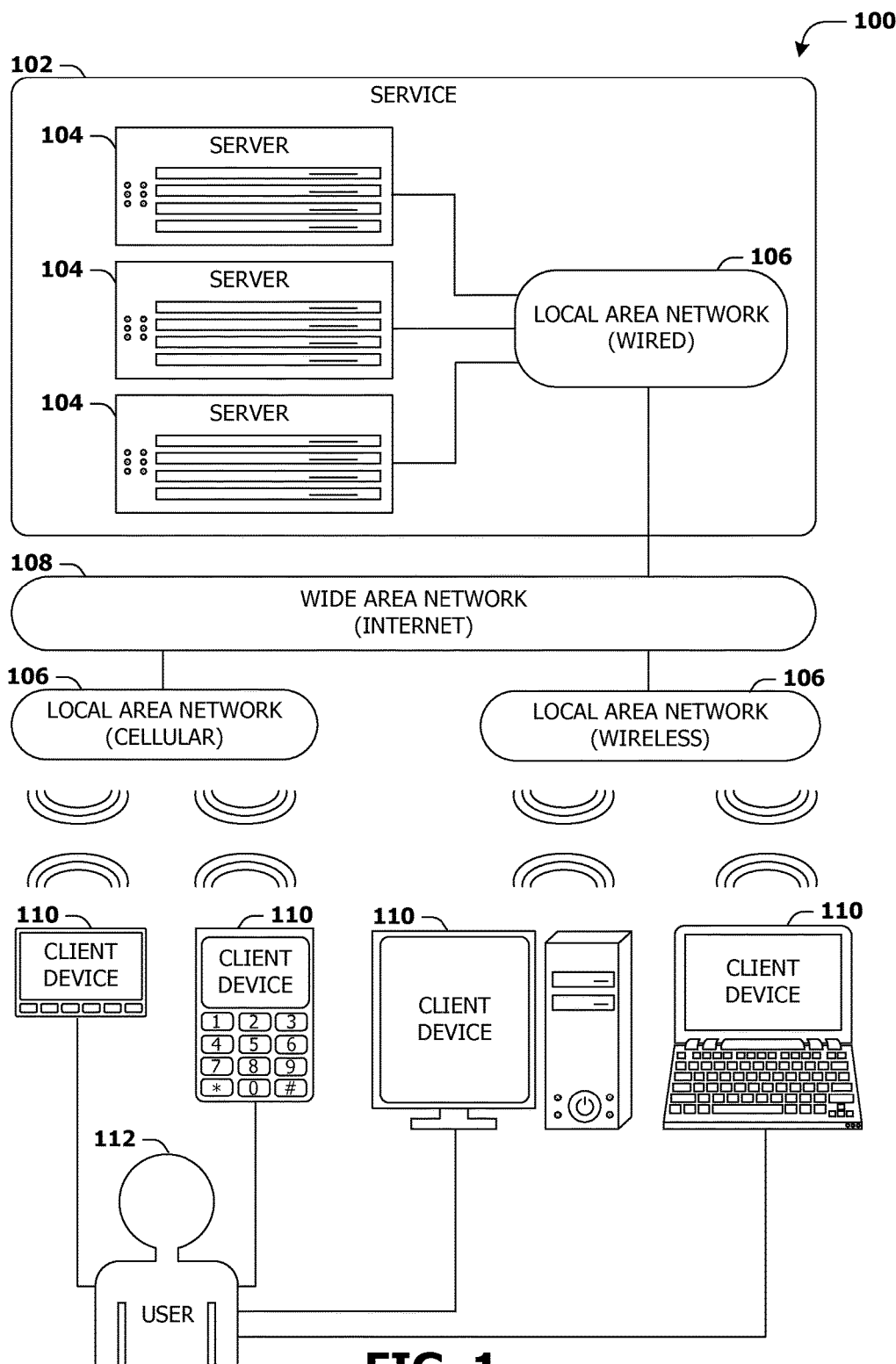
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
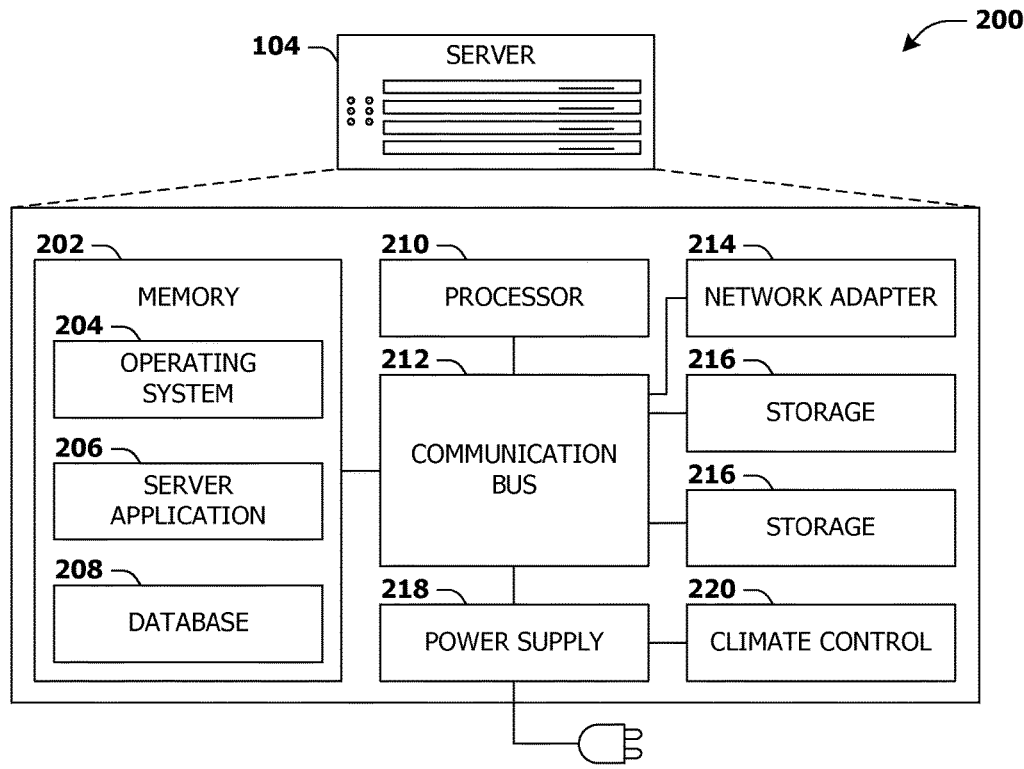
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
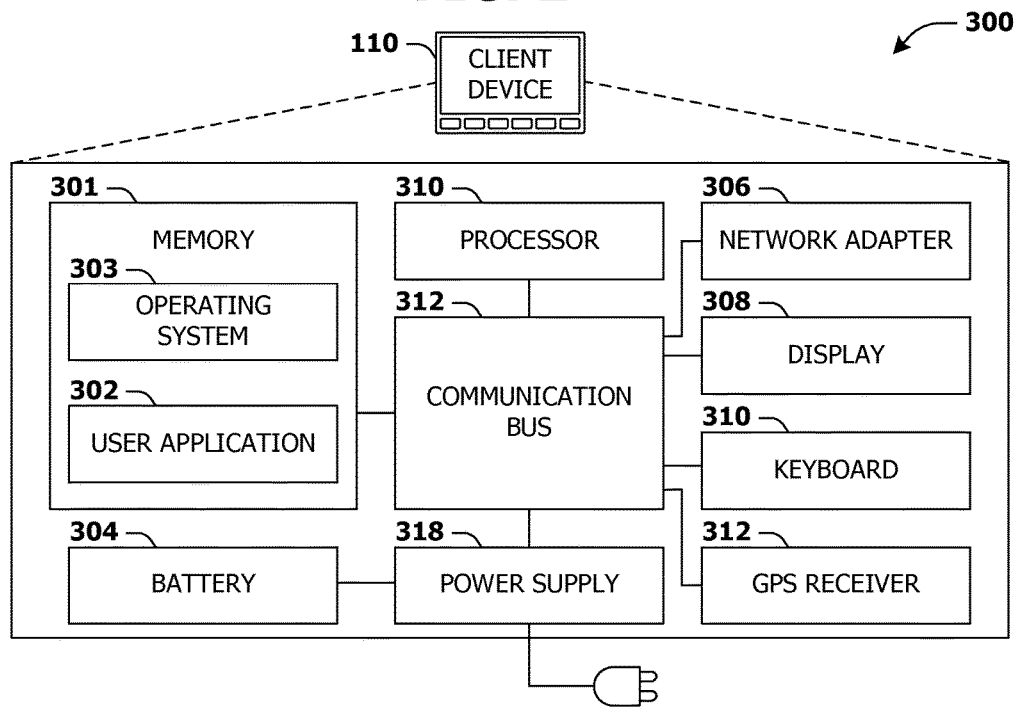
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for providing targeted crash fixes to client devices are provided herein. Client devices experiencing crashes of an application are a subset, generally less than one percent, of client devices utilizing the application. However, crash fixes for such crashes are typically sent to client devices utilizing the application regardless of whether the client devices experienced a crash of the application, which may unnecessarily consume bandwidth and/or computing resources for providing crash fixes to client devices that may not need such crash fixes. As provided herein, client devices experiencing a similar crash of the application (e.g., the application crashed when users were using/accessing a similar portion/feature of the application) may be assigned to a bucket. Buckets may be used to sort between client devices experiencing different types of crashes. Crash fixes may be developed for the various types of crashes, such as a first crash fix for the first crash associated with a first bucket. The crash fixes may be provided to those client devices that experienced the crash that the crash fix was designed to fix. For example, the first client device may receive the first crash fix, while a second client device that is also utilizing the application, but not experiencing the first crash, may not receive the first crash fix.

The ability to selectively provide crash fixes to client devices to which the crash fix pertains, reduces network bandwidth and/or computing resources otherwise used to provide crash fixes to all users that may or may not experiencing crashes. For example, if 1% of users experience the first crash, then the first crash fix is provided to that 1% of users as opposed to all users. In the example above, the network bandwidth requirement to resolve the first crash may be reduced by about 99%. Further, the computing power of client devices would likewise be reduced by about 99%, as only 1% of client device may be installing the first crash fix. Further, by selectively providing crash fixes to client devices that have experienced a crash, less client device memory is consumed for storing crash fix data.

By providing the first crash fix to client devices that have experienced the first crash, developers of the application and crash fixes will have a better view/understanding of how the crash fixes function/resolve the crash, as the crash fixes are going to client devices that are experiencing the crash (i.e., selectivity of distribution of the crash fixes acts as an inherent filter for information regarding a particular crash fix).

Constant updates to fix crashes may imply to users of the application that the application crashes often, when in actuality a small percentage of client devices experience a crash. Further, users of client devices that did not experience application crashes may become frustrated with constant updates causing application developers to lose users (e.g., companies will lose business and/or good will).

Figure 4:
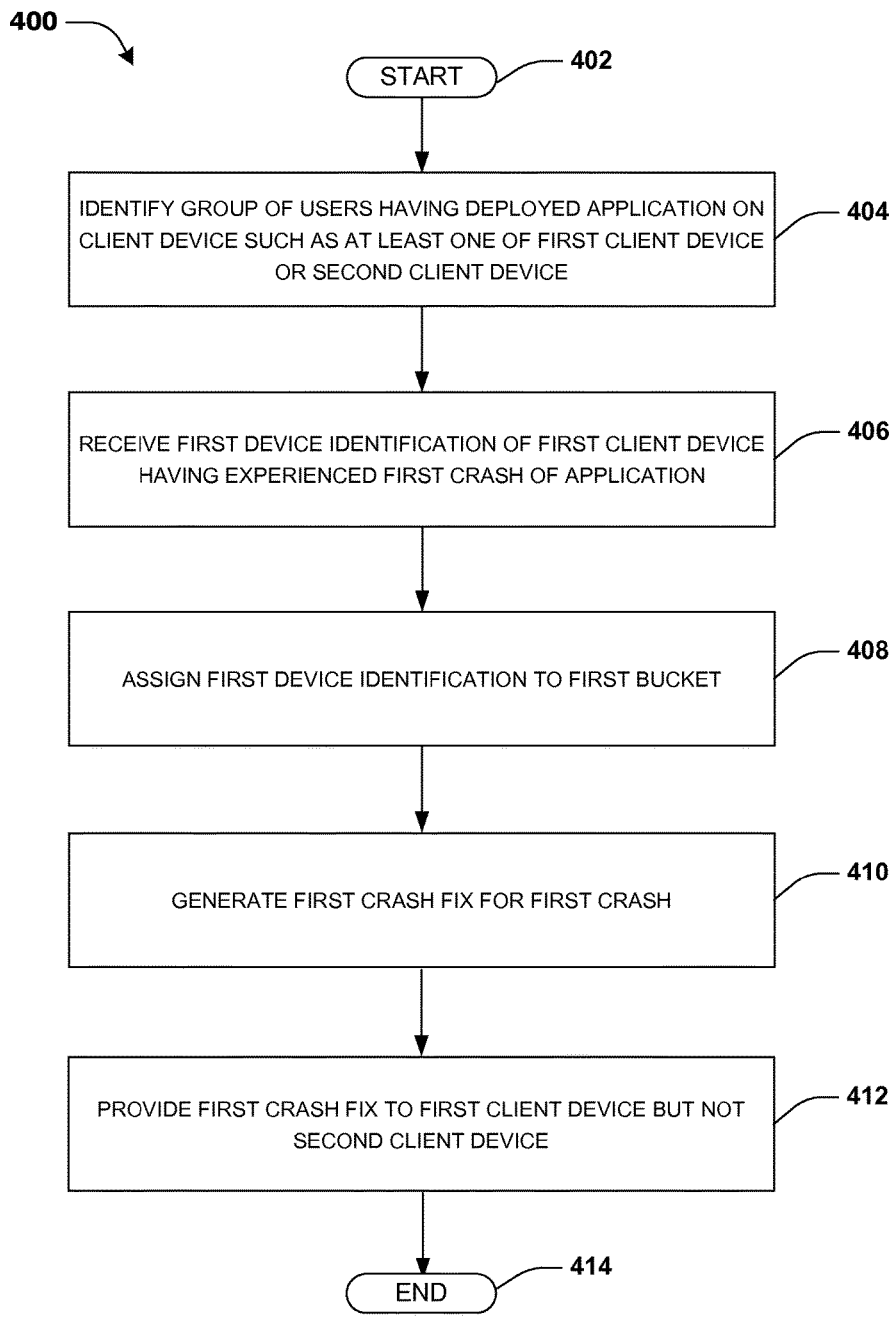
FIG. 4 is a flow chart illustrating an example method of providing a targeted crash fix to client devices.

An embodiment of providing targeted crash fixes to client devices is illustrated by an example method 400 of FIG. 4. At 402, the method starts. At 404, a group of users having deployed an application on a client device may be identified, such as a first client device. A first user having utilized the application on the first client device may experience a first crash of the application. In an example, a crash occurs when the application stops working normally, quits unexpectedly, etc. The first crash may have a first crash signature. In an example, a crash signature indicates the nature of a crash (e.g., a crash signature of a geographical mapping application may indicate that the geographical mapping application crashes when users of a particular type of smart phone view a map of Miami, invoke a particular feature such as zooming, etc.).

At 406, a first device identification, of the first client device having experienced the first crash of the application, may be received. In an example, the first client device may be configured to report the first device identification, such as to an application store, based upon the first crash. The first device identification comprises a first crash signature indicating that the application experienced the first crash on the first client device. In an example, the first device identification may comprise a device identifier that may be a unique identifier assigned to the first client device, that may be used, such as by the application store, to identify/recognize the first client device. At 408, the first device identification may be assigned to a first bucket. In an example, the first bucket designates one or more device identifications of client devices having experienced the first crash. In an example, client devices having experienced a crash may be sorted by crash signatures into buckets using device identifications. In an example, device identifications experiencing similar crashes having similar or the same crash signatures (e.g., crash signatures indicating that the geographical mapping application crashes when users of a particular type of smart phone view the map of Miami) may be assigned to one or more buckets containing device identifications of client devices having experienced crashes with like crash signatures. In an example, buckets may be designated for specific types of crashes.

At 410, a first crash fix may be generated for the first crash. In an example, the first crash fix may be a special build of the application that is targeted at the first crash signature of the first crash. In an example, when possible, the first crash fix may be generated to resolve one or more crashes simultaneously (e.g., the first crash fix will resolve the first crash and a second crash having a second crash signature). When the first crash fix resolves one or more crashes, the first crash fix is provided to those client devices to which the first crash fix pertains. At 412, the first crash fix may be provided to the first client device but not the second client device. For example, the first crash fix may be marked as not being applicable to the second client device because a second device identification of the second client device has not been assigned to the first bucket. In an example, the first crash fix may be provided to the first client device automatically, such as when the first client device is notified of a first update opportunity. In an example, the first crash fix may be provided to the first client device in response to the first client device requesting an update from the application store. At 414, the method ends.

Figure 5:
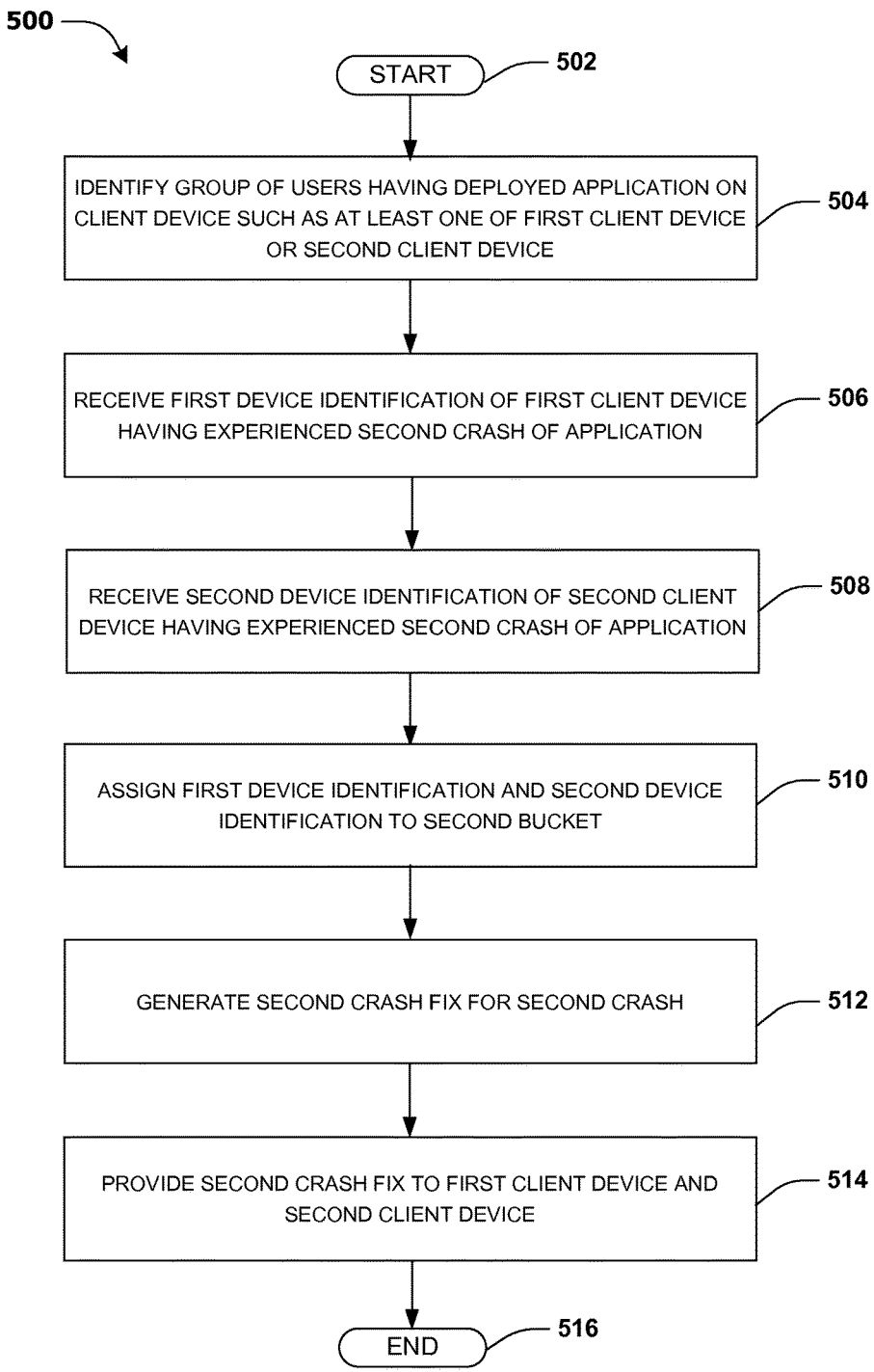
FIG. 5 is a flow chart illustrating an example method of providing a targeted crash fix to client devices.

An embodiment of providing targeted crash fixes to client devices is illustrated by an example method 500 of FIG. 5. At 502, the method starts. At 504, a group of users having deployed an application on a client device may be identified, such as a first client device and/or a second client device. In an example, a first user having utilized the application on the first client device may experience a second crash of the application. In an example, a second user having utilized the application on the second client device may experience the second crash of the application. In an example, the second crash may have a second crash signature.

At 506, a first device identification, of the first client device having experienced the second crash of the application, may be received. In an example, the first device identification, of the first client device experiencing the second crash, may comprise the second crash signature, which may be reported to an application store. At 508, a second device identification, of the second client device having experienced the second crash of the application may be received. In an example, the second device identification of the second client device experiencing the second crash having the second crash signature may be reported to the application store.

At 510, the first device identification and the second device identification may be assigned to a second bucket. In an example, the second bucket designates one or more device identifications of client devices having experienced the second crash. At 512, a second crash fix may be generated for the second crash. In an example, the second crash fix may be a special build targeted at the second crash signature of the second crash. In an example, when possible, the second crash fix will be generated to resolve one or more crashes simultaneously (e.g., the second crash fix will resolve the second crash and a third crash having a third crash signature). When the second crash fix resolves one or more crashes, the first crash fix is provided to those client devices to which the second crash fix pertains. At 514, the second crash fix may be provided to the first client device and the second client device, but not other client devices that have not experienced the second crash. In an example, the second crash fix may be provided to the first client device and the second client device automatically, such as when at least one of the first client device or the second client device is notified of a second update opportunity. In an example, the second crash fix may be provided to the first client device in response to the first client device requesting an update of the application, such as requesting an update from the application store. In an example, the second crash fix may be provided to the second client device in response to the second client device requesting an update of the application, such as requesting the update from the application store. At 516, the method ends.

Figure 6A:
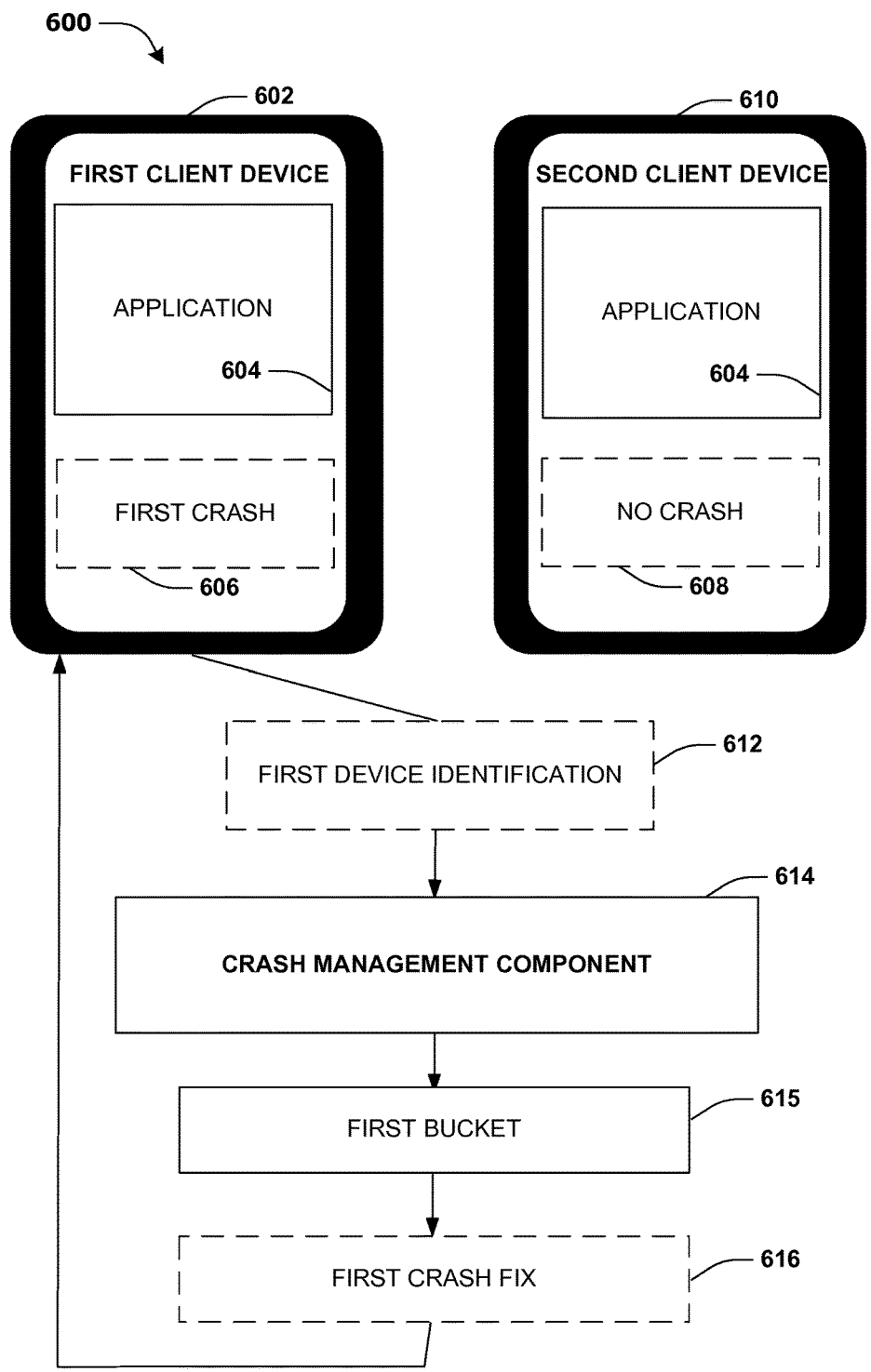
FIG. 6A is a component block diagram illustrating an example system for providing a targeted crash fix for a crash of an application to client devices, where client devices are labeled using device identifications.
Figure 6B:
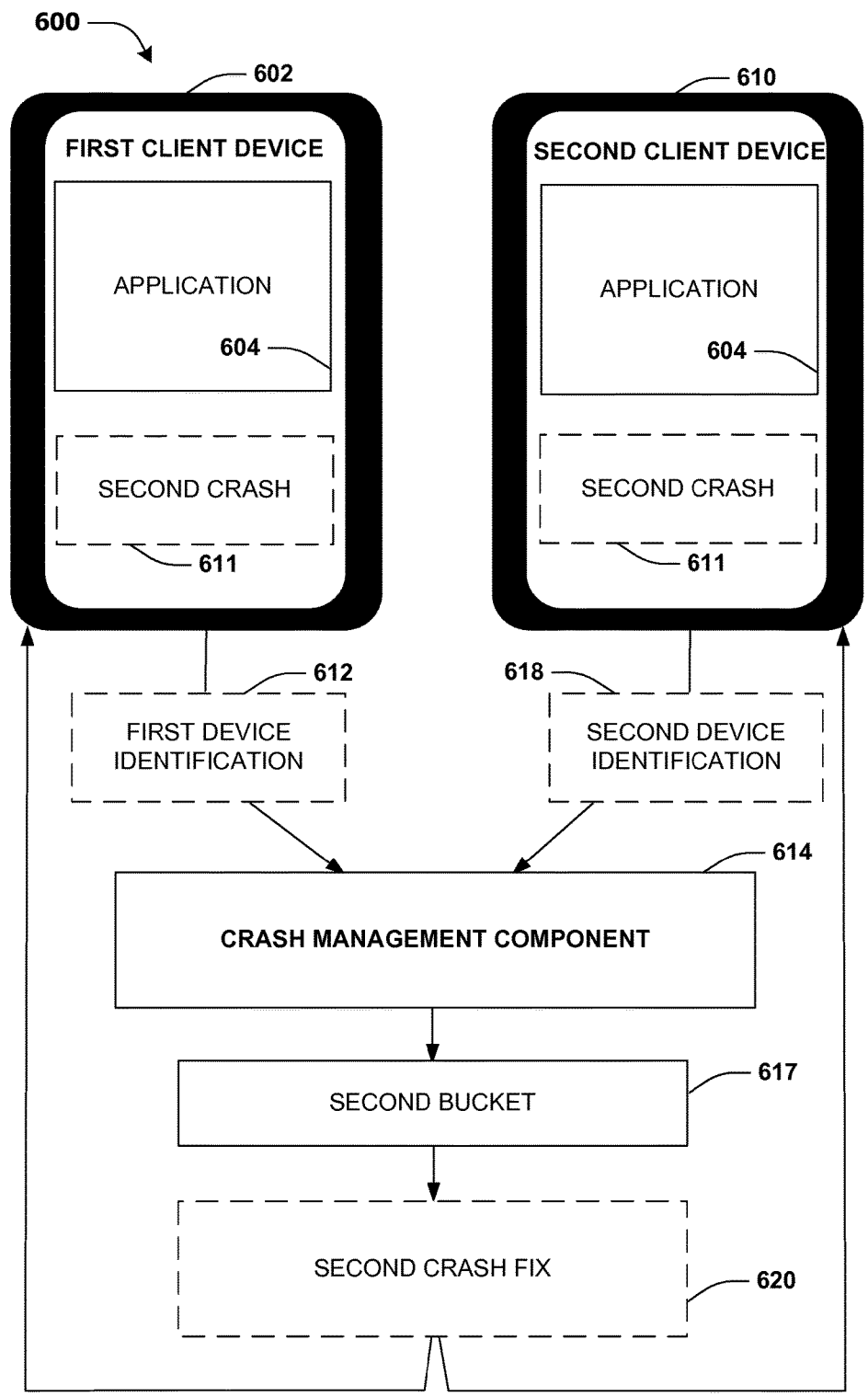
FIG. 6B is a component block diagram illustrating an example system for providing a targeted crash fix for a crash of an application to client devices, where client devices are labeled using device identifications.
Figure 6C:
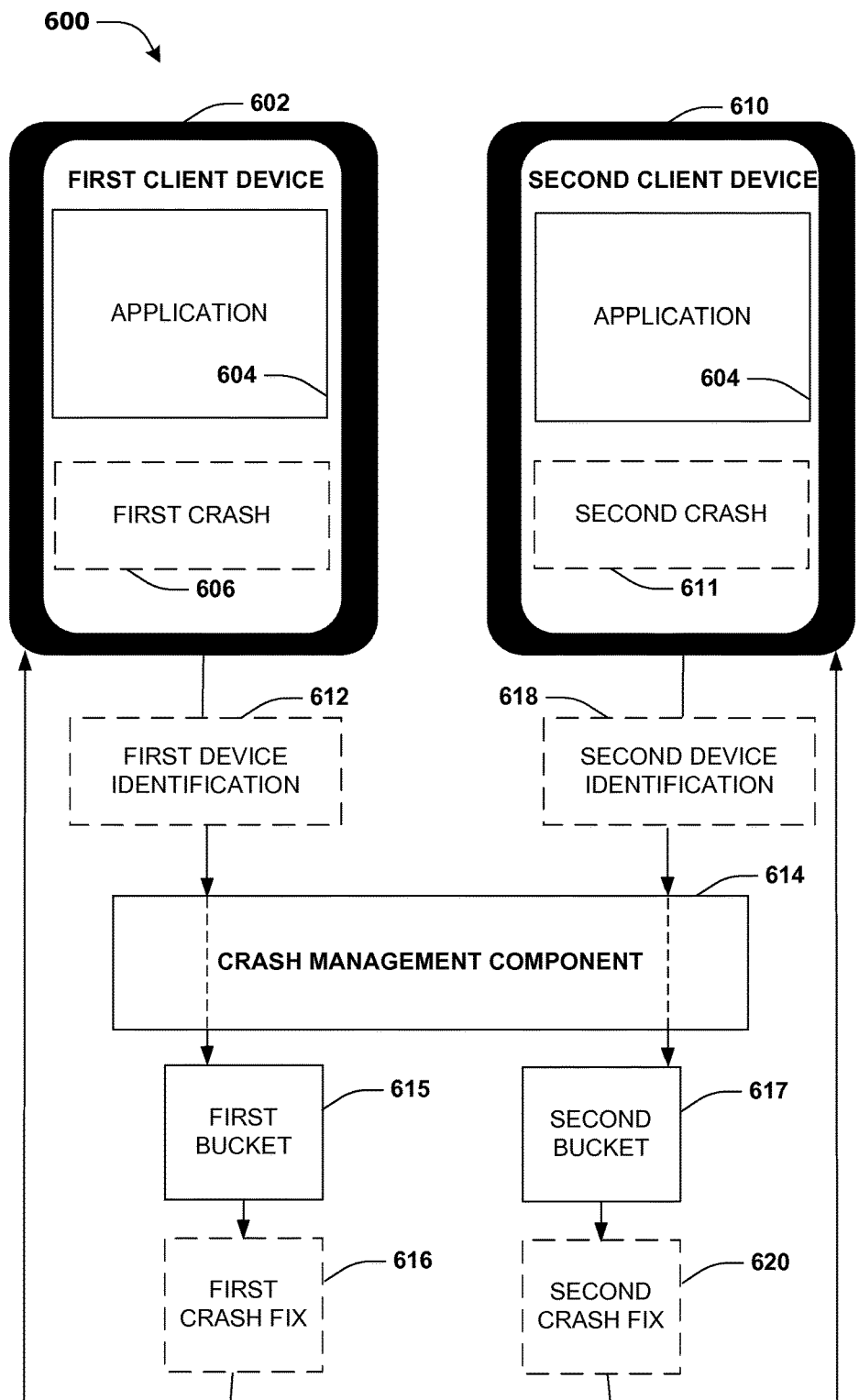
FIG. 6C is a component block diagram illustrating an example system for providing a targeted crash fix for a crash of an application to client devices, where client devices are labeled using device identifications.

FIGS. 6A-6C illustrate a system 600, comprising a crash management component 614, configured to generate targeted crash fixes. FIG. 6A illustrates the crash management component 614 generating a targeted first crash fix for a first client device 602. The crash management component 614 may be associated with the first client device 602 and/or a second client device 610 (e.g., the crash management component 614 may be hosted by a service accessible to at least one of the first client device 602, the second client device 610, an application store that distributed an application 604 to the first client device 602 and the second client device 610, a browser plugin, etc.). A first user of the first client device 602 may use the application 604. The application 604 may experience a first crash 606 having a first crash signature. A second user of the second client device 610 may use the application 604, and the application 604 may experience no crash 608 (e.g., the application 604 performs along normal parameters, does not stop working unexpectedly, etc.). In an example, after the first client device 602 experiences the first crash 606, a first device identification 612 of the first client device 602 may be received by the crash management component 614. The first device identification 612 may comprise the first crash signature of the first crash 606. In an example, the crash management component 614 may assign the first device identification 612 to a first bucket 615. The first bucket 615 may designate one or more device identifications of client devices having experienced the first crash 606. In an example, the crash management component 614 may generate a first crash fix 616 for the first crash 606. In an example, the crash management component 614 may provide the first crash fix 616 to client devices assigned to the first bucket 615, such as the first client device 602. In an example, the crash management component 614 may provide the first crash fix 616 to the first client device 602 but not the second client device 610. The ability to selectively provide the first crash fix 616 to merely client devices to which the first crash fix 616 pertains, reduces network bandwidth and/or computing resources of the crash management component 614 and/or client devices that have not experienced the first crash and thus have not received the first crash fix 616, such as the second client device 610 (e.g., otherwise such network bandwidth and/or computing resources would have been used to provide client devices that did not experience the first crash, such as the second client device 610, with the first crash fix 616).

FIG. 6B illustrates the crash management component 614 generating a targeted crash fix for multiple client devices. The first user of the first client device 602 may use the application 604, and the application 604 may experience a second crash 611 having a second crash signature. A second user of the second client device 610 may use the application 604, and the application 604 may experience the second crash 611. In an example, after the first client device 602 experiences the second crash 611, the first device identification 612 of the first client device 602 may be received by the crash management component 614. The first device identification 612 may comprise the second crash signature of the second crash 611. In an example, after the second client device 610 experiences the second crash 611, a second device identification 618 of the second client device 610 may be received by the crash management component 614. The second device identification 618 may comprise the second crash signature of the second crash 611. In an example, the crash management component 614 may assign the first device identification 612 and the second device identification 618 to a second bucket 617. In an example, the second bucket 617 may designate one or more device identifications of client devices having experienced the second crash 611. In an example, the crash management component 614 may generate a second crash fix 620 for the second crash 611. In an example, the crash management component 614 may provide the second crash fix 620 to client devices assigned to the second bucket 617, such as the first client device 602 and the second client device 610 (e.g., but not a third client device upon which the application 604 is deployed but has not experienced the second crash 611).

FIG. 6C illustrates the crash management component 614 generating multiple targeted crash fixes for multiple client devices. The first user of the first client device 602 may use the application 604, and the application 604 may experience the first crash 606 having the first crash signature. The second user of the second client device 610 may use the application 604, and the application 604 may experience the second crash 611 having the second crash signature. After the first client device 602 experiences the first crash 606, the first device identification 612 of the first client device 602 may be received by the crash management component 614. The first device identification 612 may comprise the first crash signature of the first crash 606. After the second client device 610 experiences the second crash 611, the second device identification 618 of the second client device 610 may be received by the crash management component 614. The second device identification 618 may comprise the second crash signature of the second crash 611. In an example, the crash management component 614 may assign the first device identification 612 to the first bucket 615 and the second device identification 618 to the second bucket 617. In an example, the first bucket 615 may designate one or more device identifications of client devices having experienced the first crash 606. In an example, the second bucket 617 may designate one or more device identifications of client devices having experienced the second crash 611. In an example, the crash management component 614 may generate the first crash fix 616 for the first crash 606 and the second crash fix 620 for the second crash 611. In an example, the crash management component 614 may provide the first crash fix 616 to client devices assigned to the first bucket 615, such as the first client device 602. In an example, the crash management component 614 may provide the second crash fix 620 to client devices assigned to the second bucket 617, such as the second client device 610. The ability to selectively provide the first crash fix 616 merely to client devices to which the first crash fix 616 pertains and to selectively provide the second crash fix 620 merely to client devices to which the second crash fix 620 pertains, reduces network bandwidth and/or computing resources of the crash management component 614 and/or the client devices that have not experienced such crashes and thus have not received the corresponding crash fix. In an example, absent the crash management component 614, the first crash fix 616 and the second crash fix 620 may be provided to both the first client device 602 and the second client device 610. In an example, with the crash management component 614, the network bandwidth needed to provide the first crash fix 616 and the second crash fix 620 may be about half of the network bandwidth needed absent the crash management component 614. In an example, with the crash management component 614, the computing power needed to utilize the first crash fix 616 and the second crash fix 620 may be about half of the computing power needed absent the crash management component 614, (e.g., the first client device 602 uses computing power to utilize the first crash fix 616, rather than both the first crash fix 616 and the second crash fix 620).

Figure 7A:
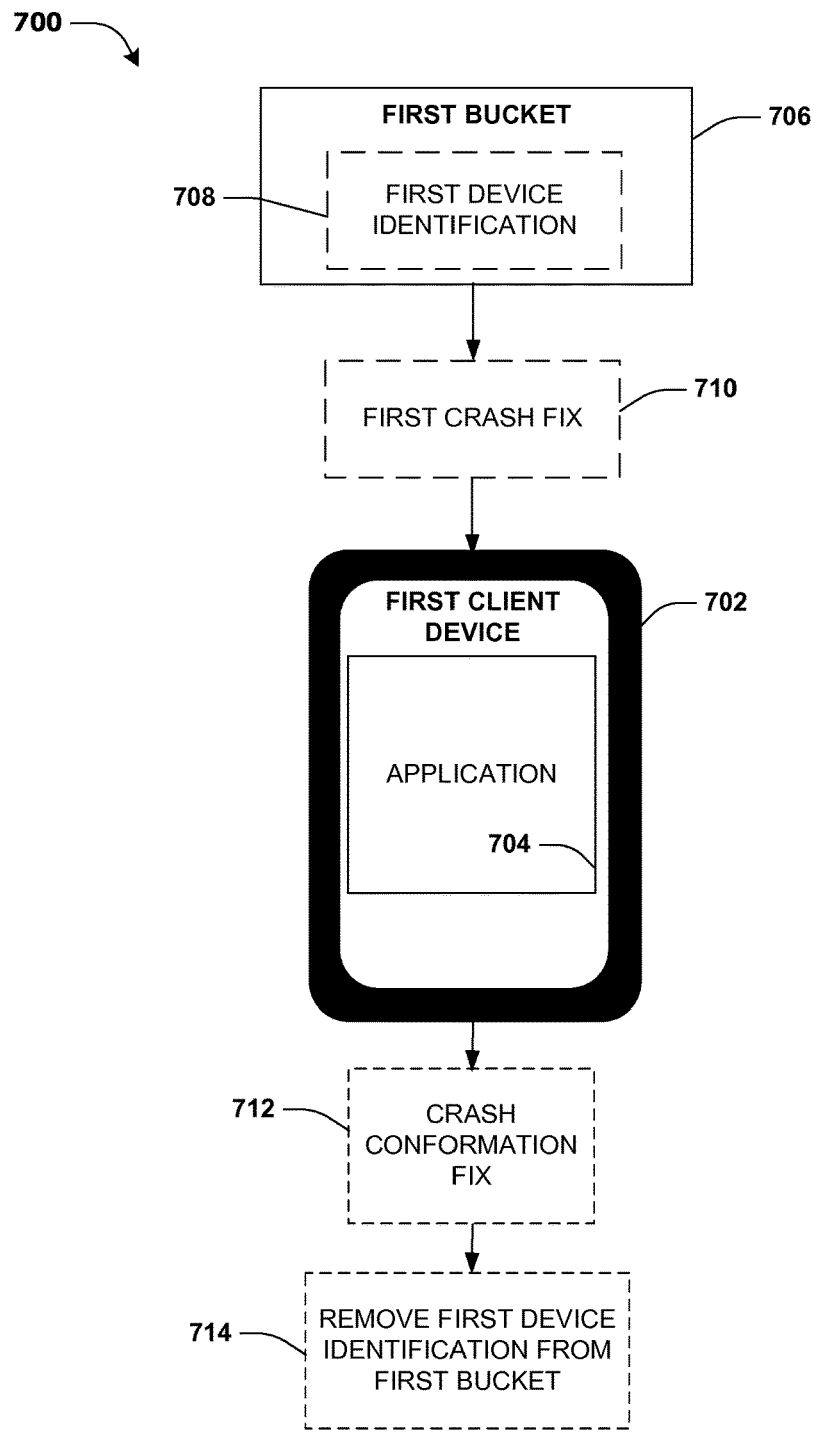
FIG. 7A is a component block diagram illustrating an example system for confirming a crash fix resolves a crash of an application.

FIGS. 7A-7E illustrate a system 700, comprising a mechanism for determining if a crash fix is needed by a client device, received by a client device, or resolves a first crash for a client device. FIG. 7A illustrates an example system for confirming that a first crash fix 710 resolves a first crash of an application 704. In an example, a first client device 702 utilizing the application 704 may experience the first crash having a first crash signature. In an example, a first device identification 708 of the first client device 702 having experienced the first crash may be received. In an example, the first device identification 708 may be assigned to a first bucket 706. In an example, the first bucket 706 may designate one or more device identifications of client devices having experienced the first crash. In an example, the first crash fix 710 may be generated to resolve the first crash. In an example, the first crash fix 710 may be provided to the first client device 702. In an example, if the first crash fix 710 resolves the first crash, a crash conformation fix 712 may be sent by the first client device 702 to at least one of an application store, a crash management component, etc. In an example, such as when the application 704 has a diagnostic algorithm, the first crash fix 710 may be tested by the diagnostic algorithm. In an example, if the diagnostic algorithm determines that the first crash fix 712 resolves the first crash, then the crash conformation fix 712 may be sent. In an example, if the first crash fix 710 resolves the first crash (e.g., another first crash does not occur within a designated time period) the crash conformation fix 712 may be designated as received by at least one of the application store, the crash management component, etc. Upon receipt or designation of receipt of the crash conformation fix 712, the first device identification 708 may be removed 714 from the first bucket 706.

Figure 7B:
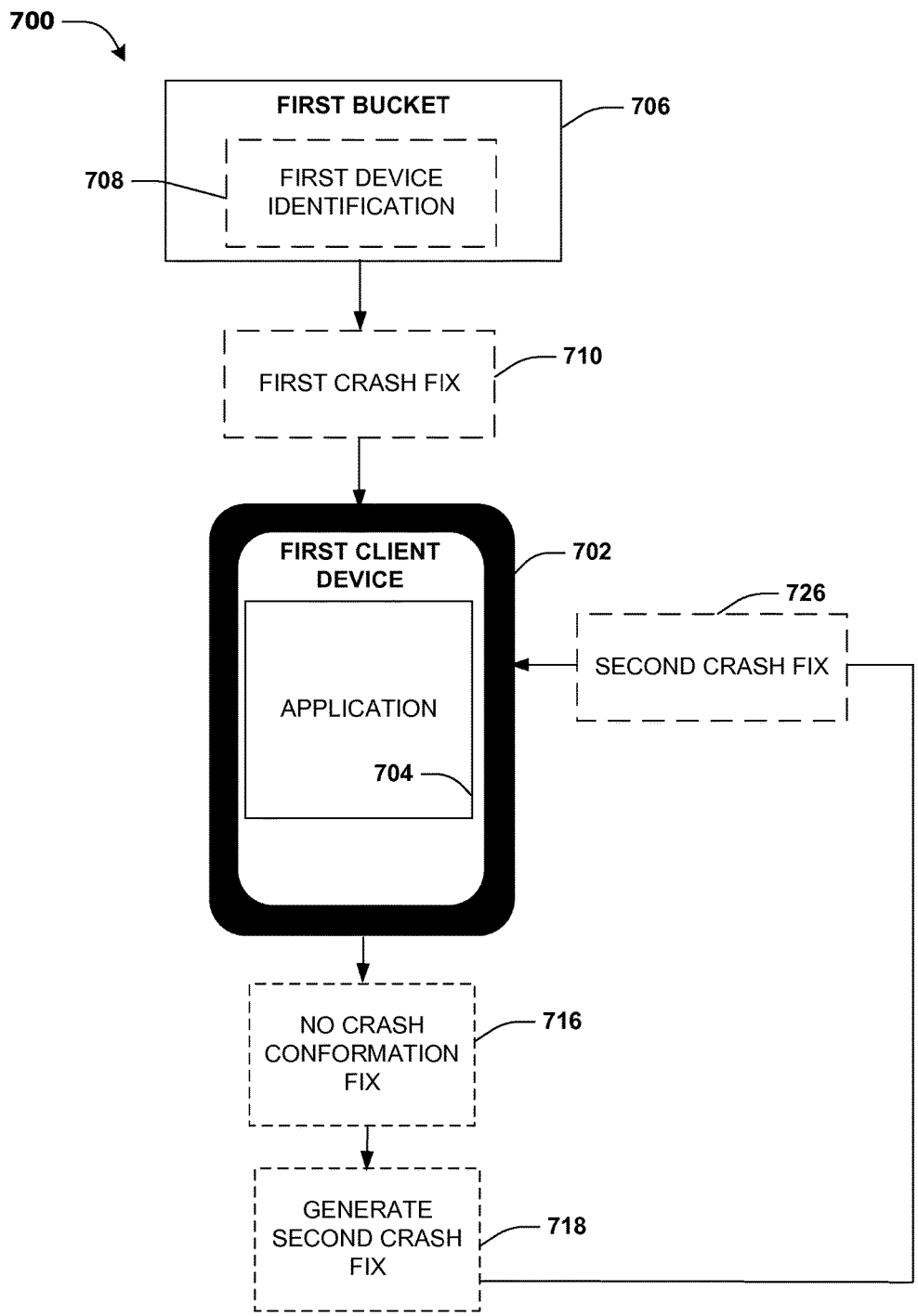
FIG. 7B is a component block diagram illustrating an example system for when a crash fix does not resolve a crash of an application.

FIG. 7B illustrates an example system for when the first crash fix 710 does not resolve the first crash of the application 704. In an example, the first crash fix 710 may be provided to the first client device 702. In an example, the first crash fix 710 may not resolve the first crash and no crash conformation fix 716 may be sent by the first client device 702 or designated as received. In an example, where the first crash fix 710 does not resolve the first crash, the first device identification 708 may retain assignment in the first bucket 706. In an example, a first hashing algorithm may identify device identifications of client devices that have been removed from the first bucket 706, provided with the first crash fix 710, and experienced the first crash again. In some examples, the first hashing algorithm may reassign the first device identification 708 to the first bucket 706. In an example, when the first crash fix is determined to not resolve the first crash, a second crash fix 726 may be generated 718 and provided to the first client device 702. In an example, if the second crash fix 726 is determined not to solve the first crash, one or more additional crash fixes may be generated until the first crash is resolved. The ability to determine if the first crash fix 710 resolves the first crash by looking at the effect of the first crash fix 710 on client devices that have experienced the first crash may provide feedback to application developers to develop better/more targeted crash fixes for crashes. Absent the ability to determine if the first crash fix 710 resolves the first crash on client devices that have experienced the first crash, excess information, such as the effect of the first crash fix 710 on client devices that did not experience the first crash, may be generated, making accurately determining whether the first crash 710 resolves the first crash more difficult (i.e., the example systems of FIGS. 7A-7B act as an inherent filter for information regarding a particular crash fix).

Figure 7C:
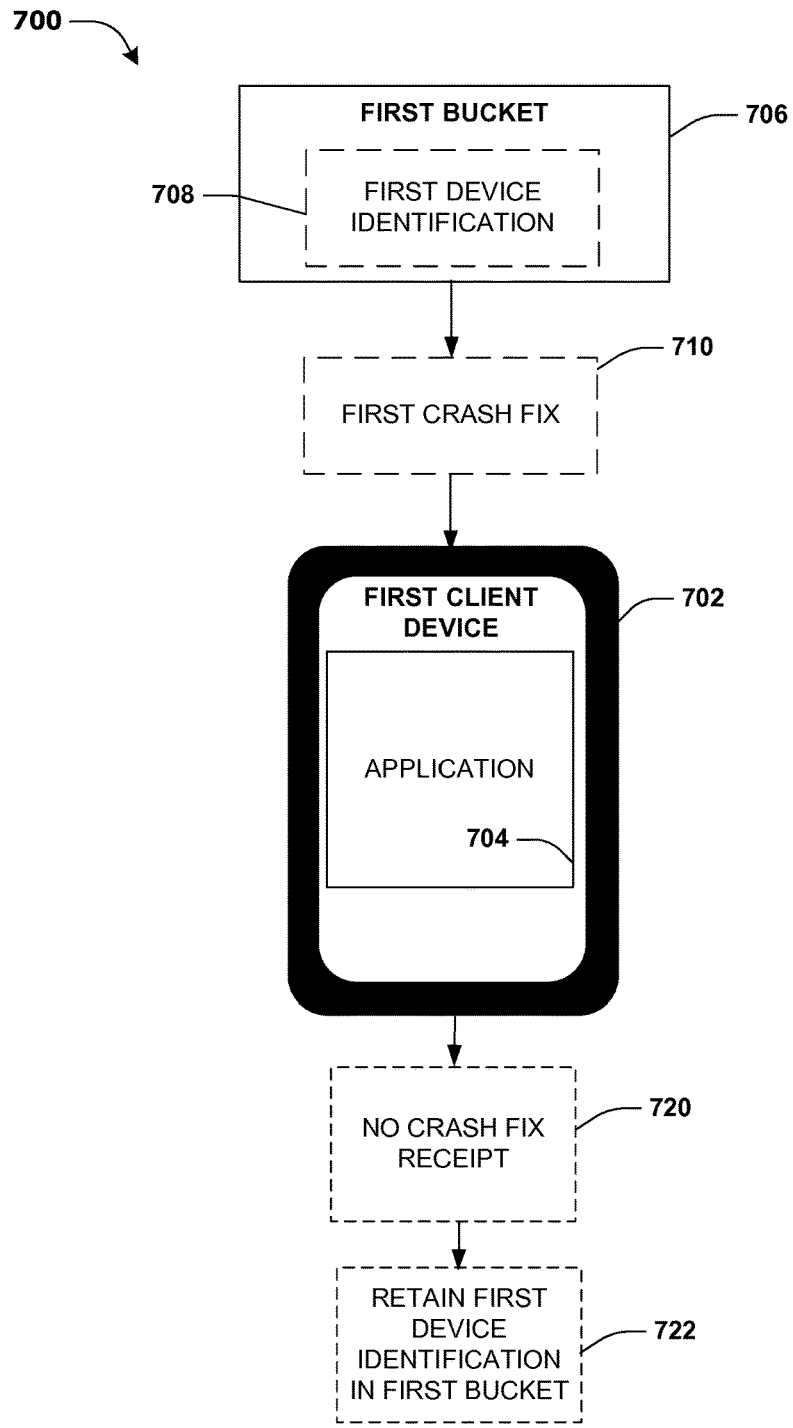
FIG. 7C is a component block diagram illustrating an example system for when a crash fix of an application is not received by a client device.

FIG. 7C illustrates an example system for when the first crash fix 710 is not received by the first client device 702. In an example, the first crash fix 710 is provided to the first client device 702. In an example, the first crash fix 710 is not received by the first client device 702 (e.g., the first client device 702 was off at the time of providing, did not have internet access, etc.). In an example, the application 704 may have an algorithm to send a crash fix receipt 720 to at least one of the application store, the crash management component, etc. in the event the first crash fix 710 is received. In an example, when no crash fix receipt 720 is received, the first device identification 708 may be retained 722 in the first bucket 706. In an example, the first device identification 708 may remain in the first bucket 706 until the crash fix receipt 720 is received.

Figure 7D:
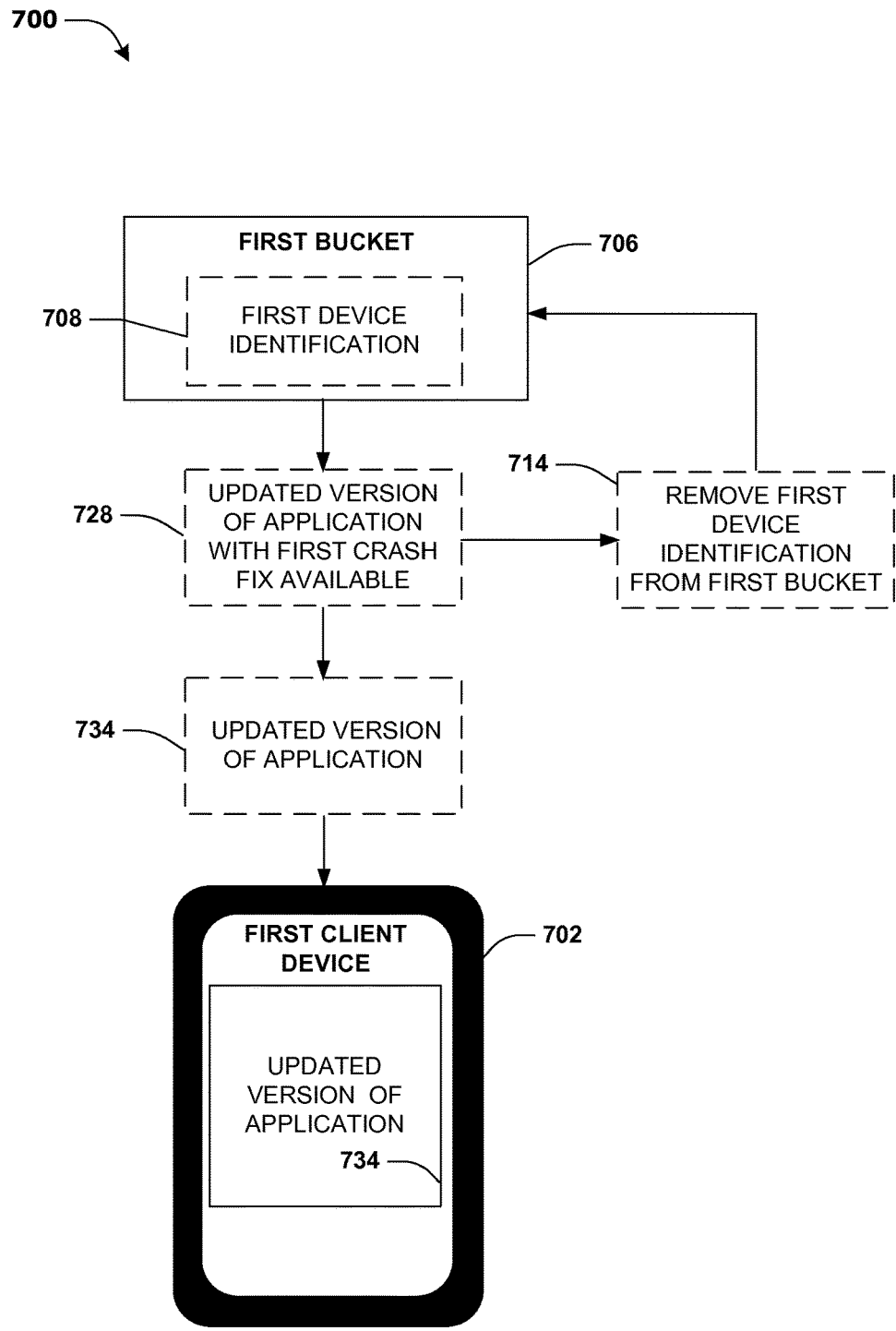
FIG. 7D is a component block diagram illustrating an example system for when a crash fix is integrated into an updated version of an application.

FIG. 7D illustrates an example system for when the crash fix 710 is integrated into an updated version of the application 734. In an example, prior to providing the first crash fix 710, a search for the updated version of the application 734 comprising the first crash fix 710 may be completed. In an example, a second hashing algorithm may complete the search for the updated version of the application 734 and may determine if the first crash fix 710 is integrated into the updated version of the application 734. In an example, when the updated version of the application 734 comprising the first crash fix 710 is available 728, the updated version of the application 734 may be sent to the first client device 702. In an example, when the updated version of the application 734 comprising the first crash fix 710 is sent to the first client device 702, the first device identification 708 may be removed 714 from the first bucket 706.

Figure 7E:
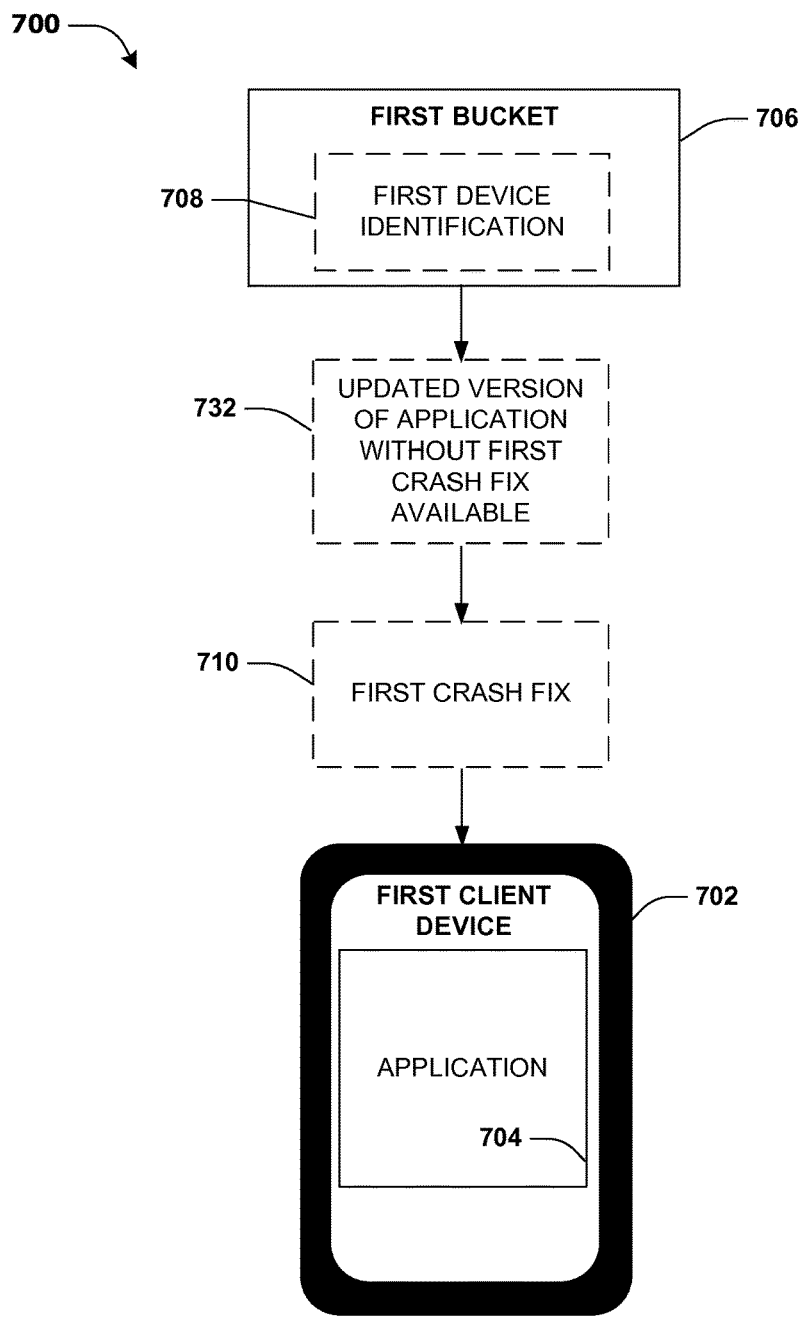
FIG. 7E is a component block diagram illustrating an example system for when a crash fix is not integrated into an updated version of an application.

FIG. 7E illustrates an example system for when the first crash fix 710 is not integrated into the updated version of the application 734. In an example, the second hashing algorithm may determine that the updated version of the application 734 is without 732 the first crash fix 710. In an example, when the updated version of the application 734 does not include the first crash fix 710, the first crash fix 710 may be sent to the first client device 702 (e.g., as opposed to the updated version of the application 734). In an example, when the first crash fix 710 is sent to the first client device 702, the first device identification 708 may be removed 714 from the first bucket 706. The ability to determine whether the first crash fix 710 or the updated version of the application 734 may be required reduces network bandwidth and/or computing resources required to resolve a crash, where the network bandwidth and/or computing resources would otherwise be used to provide client devices with both the first crash fix 710 and the updated version of the application 734. In an example, absent the ability to determine whether the first crash fix 710 or the updated version of the application 734 may be required, the first crash fix 710 and the updated version of the application 734 may be provided to the first client device 702 (e.g., the first client device 702 uses computing power to utilize both the updated version of the application 734 and the first crash fix 710, rather than the updated version of the application 734).

Figure 8:
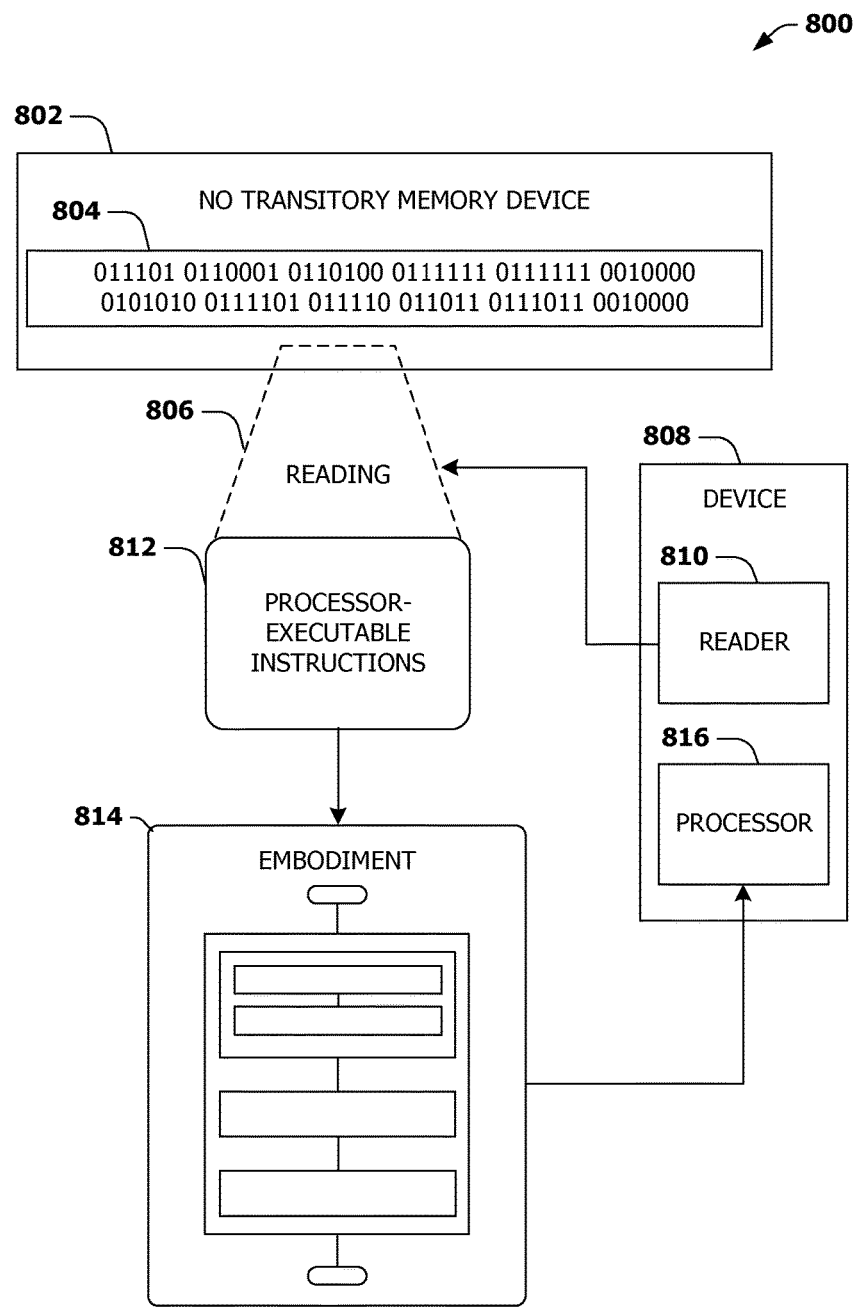
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4 and/or method 500 of FIG. 5, for example. In some embodiments, the processor-executable instructions, when executed on the processor 816 of the device 808, are configured to implement a system, such as at least some of the example system 600 of FIGS. 6A-6C, and/or at least some of the example system 700 of FIGS. 7A-7E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of targeted crash fixing, comprising:
   identifying a group of users that have deployed an application on client devices, the group of users comprising a first user having a first client device and a second user having a second client device;
   receiving a first device identification from the first client device, the first device identification comprising a first crash signature indicating that the application experienced a first crash on the first client device;
   assigning the first device identification to a first bucket designating one or more device identifications of client devices having experienced the first crash;
   responsive to determining that an updated version of the application and a first crash fix for the first crash are both available, determining whether the first crash fix is integrated into the updated version of the application;

responsive to determining that the first crash fix is not integrated into the updated version of the application, providing at a first time the first crash fix but not the updated version of the application to client devices identified by the one or more device identifications of the first bucket but not to client devices, upon which the application is deployed, that are not identified by the one or more device identifications of the first bucket, the first crash fix provided to the first client device but not the second client device;

receiving, via a network connection, a crash confirmation fix from the first client device;

responsive to determining that the crash confirmation fix indicates that the first crash fix resolved the first crash on the first client device, removing the first device identification, associated with the first client device, from the first bucket;

receiving a third device identification from a third client device, the third device identification comprising a third crash signature indicating that a third application experienced a third crash on the third client device;

assigning the third device identification to a third bucket designating one or more device identifications of client devices having experienced the third crash;

responsive to determining that an updated version of the third application and a third crash fix for the third crash are both available, determining whether the third crash fix is integrated into the updated version of the third application; and responsive to determining that the third crash fix is integrated into the updated version of the third application, providing the updated version of the third application but not the third crash fix to client devices identified by the one or more device identifications of the third bucket but not to client devices, upon which the third application is deployed, that are not identified by the one or more device identifications of the third bucket, the third crash fix provided to the third client device.

2. The method of claim 1, wherein the application is different than the third application.

3. The method of claim 1, comprising:
providing the first crash fix to a fourth client device identified by a fourth device identification of the first bucket; and
responsive to the first crash fix not resolving the first crash for the fourth client device:
retaining the assignment of the fourth third device identification to the first bucket;
generating a second crash fix to address the first crash; and
providing the second crash fix to the fourth client device.

4. The method of claim 1, comprising:
providing the first crash fix to a fourth client device identified by a fourth device identification of the first bucket; and
responsive to the first crash fix not being received by the fourth client device:
retaining the assignment of the fourth device identification to the first bucket; and
providing the first crash fix to the fourth client device.

5. The method of claim 1, comprising:
receiving a third crash confirmation fix from the client device; and responsive to determining that the third crash confirmation fix indicates that the updated version of the third application resolved the third crash on the client device, removing the device identification, associated with the first client device, from the third bucket.

6. The method of claim 1, comprising:
responsive to a second device identification of the second client device not being assigned to the first bucket, marking the first crash fix as not being applicable to the second client device.

7. The method of claim 1, comprising:
receiving a fourth device identification from a fourth client device, the fourth device identification comprising a fourth crash signature indicating that a fourth application experienced a fourth crash on the fourth client device;
assigning the fourth device identification to a fourth bucket designating one or more device identifications of client devices having experienced the fourth crash;
responsive to determining that an updated version of the fourth application and a fourth crash fix for the fourth crash are both available, determining whether the fourth crash fix is integrated into the updated version of the fourth application; and
responsive to determining that the fourth crash fix is not integrated into the updated version of the fourth application, providing the fourth crash fix to client devices identified by the one or more device identifications of the fourth bucket but not to client devices, upon which the fourth application is deployed, that are not identified by the one or more device identifications of the fourth bucket, the fourth crash fix provided to the fourth client device.

8. The method of claim 1, comprising:
receiving the first device identification from the first client device, the first device identification comprising a second crash signature indicating that the application experienced a second crash on the first client device; and
assigning the first device identification to a second bucket designating one or more device identifications of client devices having experienced the second crash.

9. The method of claim 8, comprising:
receiving a second device identification from the second client device, the second device identification comprising the second crash signature indicating that the application experienced the second crash on the second client device; and
assigning the second device identification to the second bucket.

10. The method of claim 9, comprising:
creating a second crash fix to address the second crash;
sending the second crash fix to the first client device and to the second client device; and
removing the first device identification and the second device identification from the second bucket.

11. A system for targeted crash fixing, comprising:
a processor; and
memory comprising processor-executable instructions that when executed by the processor cause implementation of a crash management component configured to:
receive a first device identification from a first user having a first client device, the first device identification comprising a first crash signature indicating that an application experienced a first crash on the first client device;

assign the first device identification to a first bucket designating one or more device identifications of client devices having experienced the first crash;

responsive to determining that an updated version of the application and a first crash fix for the first crash are both available, determine whether the first crash fix is integrated into the updated version of the application;

responsive to determining that the first crash fix is not integrated into the updated version of the application, provide the first crash fix to client devices assigned to the first bucket but not to client devices, upon which the application is deployed, that are not assigned to the first bucket, the first crash fix provided to the first client device but not a second client device, where the application is deployed on the second client device and the second client device was not assigned to the first bucket;

receive, via a network connection, a crash confirmation fix from the first client device;

responsive to determining that the crash confirmation fix indicates that the first crash fix resolved the first crash on the first client device, remove the first device identification, associated with the first client device, from the first bucket;

receive a device identification from a client device, the device identification comprising a third crash signature indicating that a third application experienced a third crash on the client device;

assign the device identification to a third bucket designating one or more device identifications of client devices having experienced the third crash;

responsive to determining that an updated version of the third application and a third crash fix for the third crash are both available, determine whether the third crash fix is integrated into the updated version of the third application; and responsive to determining that the third crash fix is integrated into the updated version of the third application, provide the updated version of the third application to client devices identified by the one or more device identifications of the third bucket but not to client devices, upon which the third application is deployed, that are not identified by the one or more device identifications of the third bucket, the third crash fix provided to the client device.

12. The system of claim 11, the crash management component configured to:
provide the first crash fix to a fourth client device identified by a fourth device identification of the first bucket; and
responsive to the first crash fix not resolving the first crash for the fourth client device:
retain the assignment of the fourth device identification to the first bucket;
generate a second crash fix to address the first crash; and
provide the second crash fix to the fourth client device.

13. The system of claim 11, the crash management component configured to:
receive a third crash confirmation fix from the client device; and
responsive to determining that the third crash confirmation fix indicates that the updated version of the third application resolved the third crash on the client device, remove the device identification, associated with the first client device, from the third bucket.

14. The system of claim 11, wherein the application is different than the third application.

15. The system of claim 11, the crash management component configured to:
receive the first device identification from the first client device, the first device identification comprising a second crash signature indicating that the application experienced a second crash on the first client device; and
assign the first device identification to a second bucket designating one or more device identifications of devices having experienced the second crash.

16. The system of claim 15, the crash management component configured to:
receive a second device identification from the second client device, the second device identification comprising the second crash signature indicating that the application experienced the second crash on the second client device; and
assign the second device identification to the second bucket.

17. The system of claim 16, the crash management component configured to:
create a second crash fix to address the second crash.

18. The system of claim 17, the crash management component configured to:
send the second crash fix to the first client device and to the second client device; and
remove the first device identification and the second device identification from the second bucket.

19. A non-transitory computer readable medium comprising computer executable instructions that when executed by a processor perform a method for maintaining buckets for targeted crash fixing, comprising:
maintaining a first bucket for a first crash of an application, the first crash having a first crash signature;
maintaining a second bucket for a second crash of the application, the second crash having a second crash signature;
responsive to receiving a first crash notification, corresponding to the first crash, from a first client device, assigning a first device identification of the first client device to the first bucket;
responsive to receiving a second crash notification, corresponding to the second crash, from a second client device, assigning a second device identification of the second client device to the second bucket;
responsive to determining that an updated version of the application and a first crash fix for client devices assigned to the first bucket are both available, determining whether the first crash fix is integrated into the updated version of the application;
generating second crash fix for client devices assigned to the second bucket;
responsive to determining that the first crash fix is integrated into the updated version of the application, providing the updated version of the application but not the first crash fix to the first client device based upon the first client device being assigned to the first bucket but not to client devices, upon which the application is deployed, that are not assigned to the first bucket;
providing the second crash fix to the second client device based upon the second client device being assigned to the second bucket but not to client devices, upon which the application is deployed, that are not assigned to the second bucket;

receiving, via a network connection, a crash confirmation fix from the first client device;

responsive to determining that the crash confirmation fix indicates that the updated version of the application resolved the first crash on the first client device, removing the first device identification, associated with the first client device, from the first bucket;

receiving, via a second network connection, a second crash confirmation fix from the second client device;

responsive to determining that the second crash confirmation fix indicates that the second crash fix resolved the second crash on the second client device, removing the second device identification, associated with the second client device, from the second bucket;

receiving a third device identification from a third client device, the third device identification comprising a third crash signature indicating that a third application experienced a third crash on the third client device;

assigning the third device identification to a third bucket designating one or more device identifications of client devices having experienced the third crash;

responsive to determining that an updated version of the third application and a third crash fix for the third crash are both available, determining whether the third crash fix is integrated into the updated version of the third application; and responsive to determining that the third crash fix is not integrated into the updated version of the third application, providing the third crash fix to client devices identified by the one or more device identifications of the third bucket but not to client devices, upon which the third application is deployed, that are not identified by the one or more device identifications of the third bucket, the third crash fix provided to the third client device.

20. The computer readable medium of claim 19, comprising:

receiving a fourth device identification from a fourth client device, the fourth device identification comprising a fourth crash signature indicating that a fourth application experienced a fourth crash on the fourth client device;

assigning the fourth device identification to a fourth bucket designating one or more device identifications of client devices having experienced the fourth crash;

responsive to determining that an updated version of the fourth application and a fourth crash fix for the fourth crash are both available, determining whether the fourth crash fix is integrated into the updated version of the fourth application; and responsive to determining that the fourth crash fix is integrated into the updated version of the fourth application, providing the updated version of the fourth application to client devices identified by the one or more device identifications of the fourth bucket but not to client devices, upon which the fourth application is deployed, that are not identified by the one or more device identifications of the fourth bucket, the fourth crash fix provided to the fourth client device.

* * * * *